(No Model.)

S. W. HOLMAN.
ELECTRIC CONDUCTOR FOR METALLIC CIRCUITS.

No. 469,248. Patented Feb. 23, 1892.

WITNESSES
W. W. Jacques
A. J. Burrows

INVENTOR
Silas W. Holman.

UNITED STATES PATENT OFFICE.

SILAS W. HOLMAN, OF NEWTON, MASSACHUSETTS.

ELECTRIC CONDUCTOR FOR METALLIC CIRCUITS.

SPECIFICATION forming part of Letters Patent No. 469,248, dated February 23, 1892.

Application filed October 10, 1891. Serial No. 408,313. (No model.)

*To all whom it may concern:*

Be it known that I, SILAS W. HOLMAN, a citizen of the United States, residing at Newton, in the county of Middlesex and Commonwealth of Massachusetts, have invented a new and useful Improvement in Electric Conductors for Metallic Circuits, of which the following description is a specification.

My invention relates to improvements in the construction of conductors for cables for use in electrical systems where complete metallic circuits are employed, particularly in long-distance telephone-lines, whereby the electrostatic capacity between the two metallic conductors of each circuit is very greatly reduced without increasing the electrostatic capacity of that metallic circuit as a whole toward neighboring conductors and without increasing the size of the cable over that heretofore used for cables of the same number of circuits and of the same size of wire.

Heretofore the usual way of arranging metallic-circuit conductors for cables for telephone-lines has been as follows: Each wire is covered with a cylindrical coating of insulating material of considerable thickness. The two wires which are to serve as the out and return wires of a metallic circuit are then twisted tightly together and constitute what is termed a "pair." Four wires or two pairs have also been tightly twisted together in the same manner. Any desired number of such pairs or strands of four wires are then laid up into a cable, which has usually been inclosed in a lead pipe.

Figure 1:
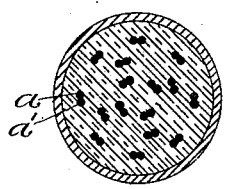

A cable made up of single pairs is represented in cross-section in Fig. 1 of the drawings. In this arrangement the two wires of each pair are brought very near together because of the compression of the coating due to the twisting operation and because of their proximity, together with the necessarily high specific inductive capacity of the intervening medium, the mutual electrostatic capacity between the two conductors of a pair becomes very large, and because of this large mutual electrostatic capacity a very large proportion of the energy sent in at one end of a telephone-cable fails to reach the distant end, but is shunted across the dielectric and wasted.

Both theory and practice show that in telephone metallic-circuit conductors constructed as above described the energy thus shunted and wasted is many times greater than that propagated along the conductors and utilized.

My invention consists in constructing metallic-circuit electric conductors for cables by coiling the insulated wires spirally into the form of a tube, thus leaving an intervening air-space within it and so arranging each pair of conductors which constitutes the out and return wires of each metallic circuit that at every point along the axis of the tube thus formed they will be diametrically opposite to one another.

Figure 2:
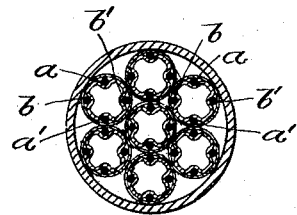
Figure 3:
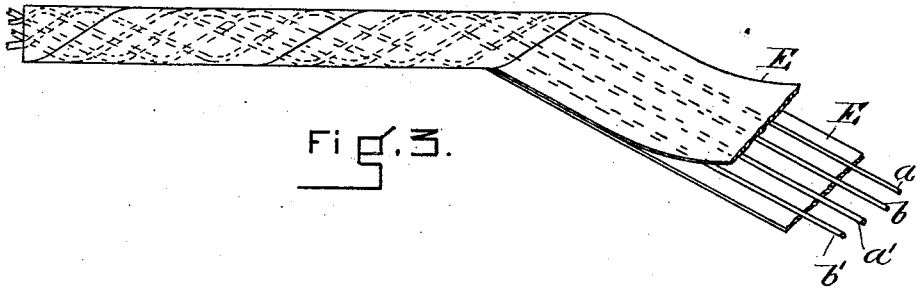
Figure 4:
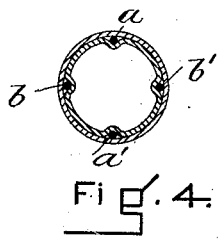
Figure 5:
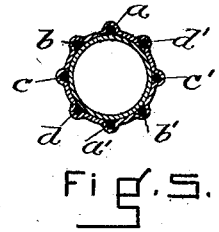

In the drawings I have illustrated in Figure 1 a cross-section of a metallic-circuit cable made in the old way; Fig. 2, a cross-section of a cable made according to my improved construction, consisting of seven tubes with four wires or two metallic circuits in each tube; Fig. 3, the manner in which the wires may be laid in the insulating material and coiled into tubular form; Fig. 4, a cross-section of such tube; Fig. 5, a cross-section of such a tube, showing the arrangement of eight wires or four pairs or circuits therein.

A convenient and economical way of constructing the tubes or electric conductors for my improved cable, which I have found excellent in practice, is illustrated in Fig. 3, wherein I lay, for instance, four copper wires *a b a' b'*, parallel to and equidistant from each other, upon a strip of paraffine cloth E and a similar strip of cloth over them and press the two firmly together, thus inclosing the wires in a thin insulating-film. The tape thus formed I coil spirally into the form of a tube or hollow cylinder. This may be successfully done by twisting it around a mandrel, which will give the tube a uniform diameter throughout, and the cloth being somewhat stiffened by the paraffine will hold the coils of wire in proper position at a uniform distance from one another, or the hollow tube may be formed by braiding lightly-insulated wires with stiff cord or twine into tubular form upon a braiding-machine, thus holding the wires in proper position and at equal distances from one another and leaving the tubular air-space as in the first-mentioned method of construction.

A single tube with an even number of wires made up in the manner above described may be used, in which the two wires of each pair, constituting the out and return conductors of each metallic circuit, are placed diametrically opposite to one another in relation to the tube thus formed—for instance, eight wires, as illustrated in Fig. 5; but in practice I prefer to use only four wires or two pairs or metallic circuits in each tube, for the reason that when more than two pairs are used there are certain disadvantages, which will be hereinafter explained.

When using only four wires or two pairs of conductors, the tube can be easily made, the minimum inductive capacity between the two wires of each pair is obtained, and there is no inductive action between the wires of the two pairs, as will be understood by reference to Figs. 2 and 4, wherein it will be seen that each of the wires $a\ a'$ of one pair is equidistant from each of the wires $b\ b'$ of the other pair. In order to obtain the requisite number of metallic circuits in each cable several such tubes may be placed together and the whole surrounded by some protecting material, such as a lead pipe, as illustrated in Fig. 2.

The same low inductive capacity between the two wires of a pair will of course be obtained by using only one pair or the out and return wires of one metallic circuit in each tube; but this arrangement would not be so economical of space and material.

When more than two pairs of conductors are employed—for example, four pairs, as illustrated in Fig. 5—there will be a small inductive action between the wires of adjacent pairs—namely, between $a\ a'$ and $b\ b'$. This is because $a$ is nearer to $b$ than to $b'$ and $a'$ is nearer to $b'$ than to $b$, and the same with the wires of any other adjacent pairs. This inductive action, however, I find can be entirely obviated if at intervals—say of ten feet throughout the length of each tube—the wires of each alternate pair are reversed in location. To illustrate, each wire of the pairs $b\ b'$ and $d\ d'$ should be carried across the tube, so that $b$ will occupy the position of $b'$ and $b'$ that of $b$, and $d$ the position of $d'$, and $d'$ that of $d$, and then after being wound about the tube for about ten feet in that position each should be returned to its original position, and so on throughout the length of the tube. The positions of the other two pairs $a\ a'$ and $c\ c'$, however, should remain as they were originally started; and by thus frequently reversing the relative location of the wires of each alternate pair, as $b\ b'$ and $d\ d'$, each wire of these two pairs will, when considered with reference to the whole extent of the line, be at substantially the same average distance from each of the wires $a\ a'$ and $c\ c'$ of the other two pairs.

When the wires are laid in tubular form by braiding, as above suggested, eight or any even number of wires may be used, and the inductive action between wires of different pairs may be overcome by laying one-half of the wires spirally in one direction and the other half in the other direction.

The great advantage of my improved construction over the old will readily be seen by reference to Figs. 1 and 2. As arranged in Fig. 1, the two wires of any pair or circuit, as $a\ a'$, are very near together and the space between them is filled with the insulating-covering, which has a high specific inductive capacity, while, as arranged in Fig. 2, the two wires of any circuit $a\ a'$ are separated by a considerable space of air, the specific inductive capacity of which is much lower than that of any other known insulator, and the detrimental effect from induction is reduced to a minimum, besides greatly reducing the weight of the cable.

The greatest benefits of my invention are obtained by leaving the space within the wire-encircled tube entirely free from all solid dielectrics, for with the exception of certain gases air has the lowest specific inductive capacity of anything yet tested; but if for any reason the tube should be filled with loose or spongy substances the benefits of my invention would be obtained in proportion to the amount of air within the interstitial spaces.

I claim—

1. A metallic-circuit electric conductor in which the out and return wires of each circuit constitute a pair and are arranged spirally in tubular form, leaving an air-space within, the two wires of each pair being located diametrically opposite to one another throughout the length of such tube and provided with supporting material to hold them in place, substantially as described, and for the purpose specified.

2. An electric metallic-circuit cable consisting of two or more pairs of insulated wires spirally arranged in the form of an air-tube and with the wires of each pair constituting the out and return wires of a metallic circuit and located diametrically opposite to each other with relation to said tube, substantially as described.

3. A metallic-circuit telephone-cable composed of two or more air-tubes, each tube consisting of an even number of insulated wires spirally arranged in the form of a hollow cylinder and with the two wires forming each metallic circuit located therein diametrically opposite to each other throughout the length of said cylinder.

SILAS W. HOLMAN.

Witnesses:
WILLIAM W. JACQUES,
A. J. BURROW.